United States Patent [19]

Takahashi et al.

[11] 3,892,424
[45] July 1, 1975

[54] VEHICLE-HEIGHT CONTROL DEVICE

[75] Inventors: Noriyuki Takahashi; Hiromitsu Miyahara, both of Tokyo; Hidehiko Inoue, Oimachi, all of Japan

[73] Assignee: Honda Giken Kogyo Kabushiki Kaisha, Tokyo, Japan

[22] Filed: Mar. 8, 1974

[21] Appl. No.: 449,469

[30] Foreign Application Priority Data
    Mar. 12, 1973  Japan.................. 48-28785

[52] U.S. Cl............................ 280/124 F; 267/64 R
[51] Int. Cl............................................. B60g 11/26
[58] Field of Search ..... 280/124 F; 267/64 R, 65 R, 267/DIG. 1, DIG. 2

[56]         References Cited
         UNITED STATES PATENTS
2,857,157  10/1958  Bonquet........................ 267/65 R
3,533,613  10/1970  Bendicsen...................... 267/64 R
3,807,717   4/1974  Ito................................... 267/64 R Primary Examiner—Philip Goodman
Attorney, Agent, or Firm—Waters, Schwartz & Nissen

[57]            ABSTRACT

An automatic vehicle-height control device including hydraulic cylinder assemblies associated with the respective wheels of the vehicle and capable of serving the dual purpose of shock absorption and vehicle-height correction. It requires no extra space for installation and is designed free from leakage of hydraulic fluid to the exterior. It is held inoperative during turning movement of the vehicle, thus allowing it to tilt sidewise ordinarily under the centrifugal effect.

9 Claims, 2 Drawing Figures

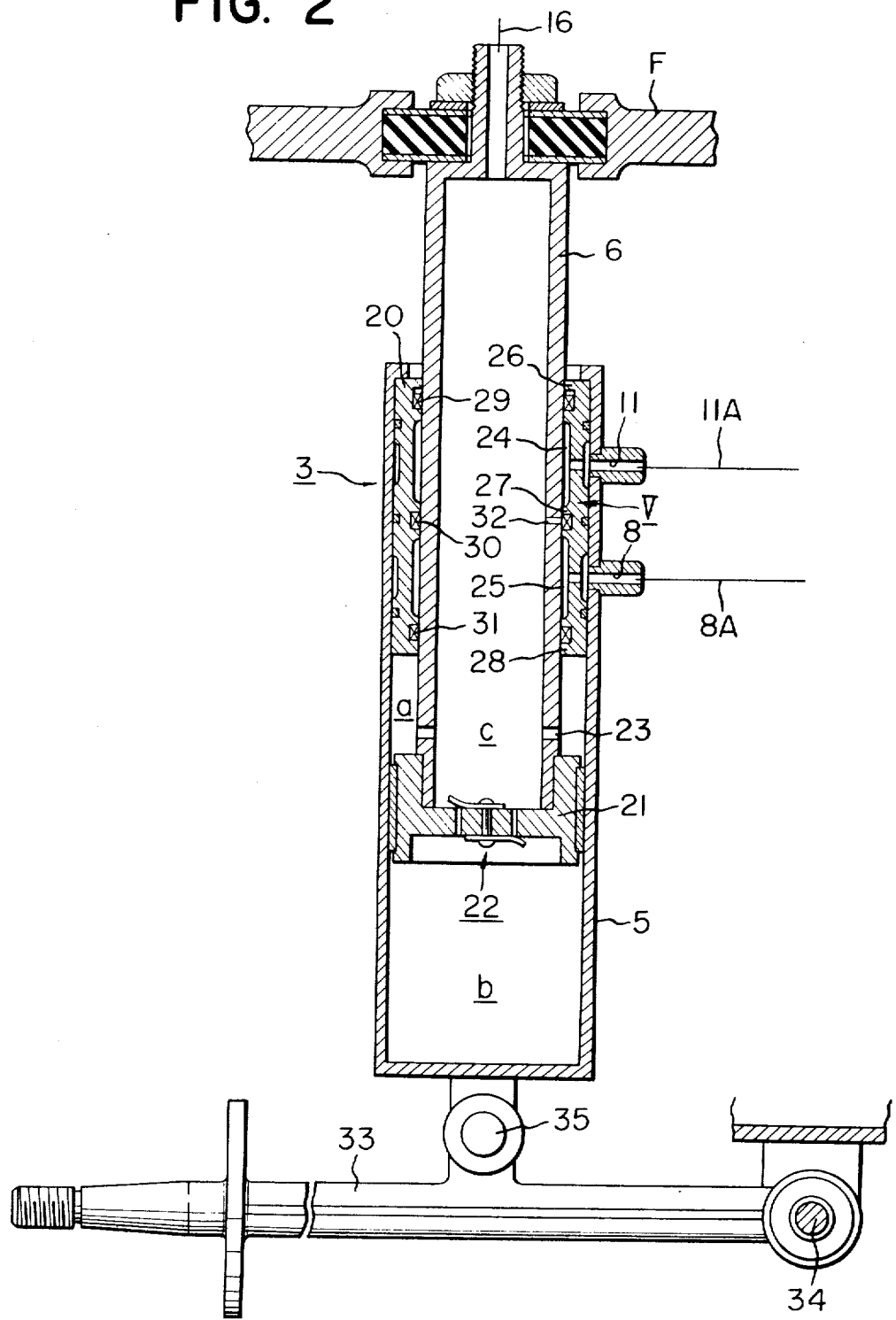

VEHICLE-HEIGHT CONTROL DEVICE

BACKGROUND OF THE INVENTION

This invention relates to automatic vehicle-height control devices for authmobiles or the like vehicles and operable under pressure of oil or other fluid automatically to compensate change in height of the vehicle.

Conventionally, vehicle-height control devices of the kind described have included oil-hydraulic cylinder units arranged between the body frame and respective wheels of the vehicle in fluid circuit parallel with the ordinary telescopic shock absorbers and operable upon detecting displacement of the wheel suspension members as occurring with change in height of the vehicle. Such arrangement has been disadvantageous in that it naturally requires extra space under the body of the vehicle for installation of the oil-hydraulic cylinder units and makes it rather difficult to obtain an optimum arrangement of wheel suspensions.

SUMMARY OF THE INVENTION

In view of the above, the present invention has for its object the provision of a new and improved vehicle-height control device of the kind described which overcomes the above-described disadvantage, employing telescopic shock absorbers ordinarily arranged between the body frame and respective road wheels of the vehicle and specifically adapted to work as hydraulic cylinder units as well for automatic vehicle-height control.

Another object of the present invention is to provide an automatic vehicle-height control device of the character described of which the shock absorber units each include a control valve of simple construction effective to prevent any leakage of working fluid from the shock absorbers to the exterior thereof.

These and other objects, features and advantages of the present invention will become apparent from the following description when taken in conjunction with the accompanying drawings.

BRIEF DESCRIPTION OF THE DRAWINGS.

In the drawings, which illustrate one preferred embodiment of the present invention:

FIG. 2 represents an axial cross-sectional view of one of the telescopic shock absorbers forming the essential part of the device.

DESCRIPTION OF THE PREFERRED EMBODIMENT

Figure 1:
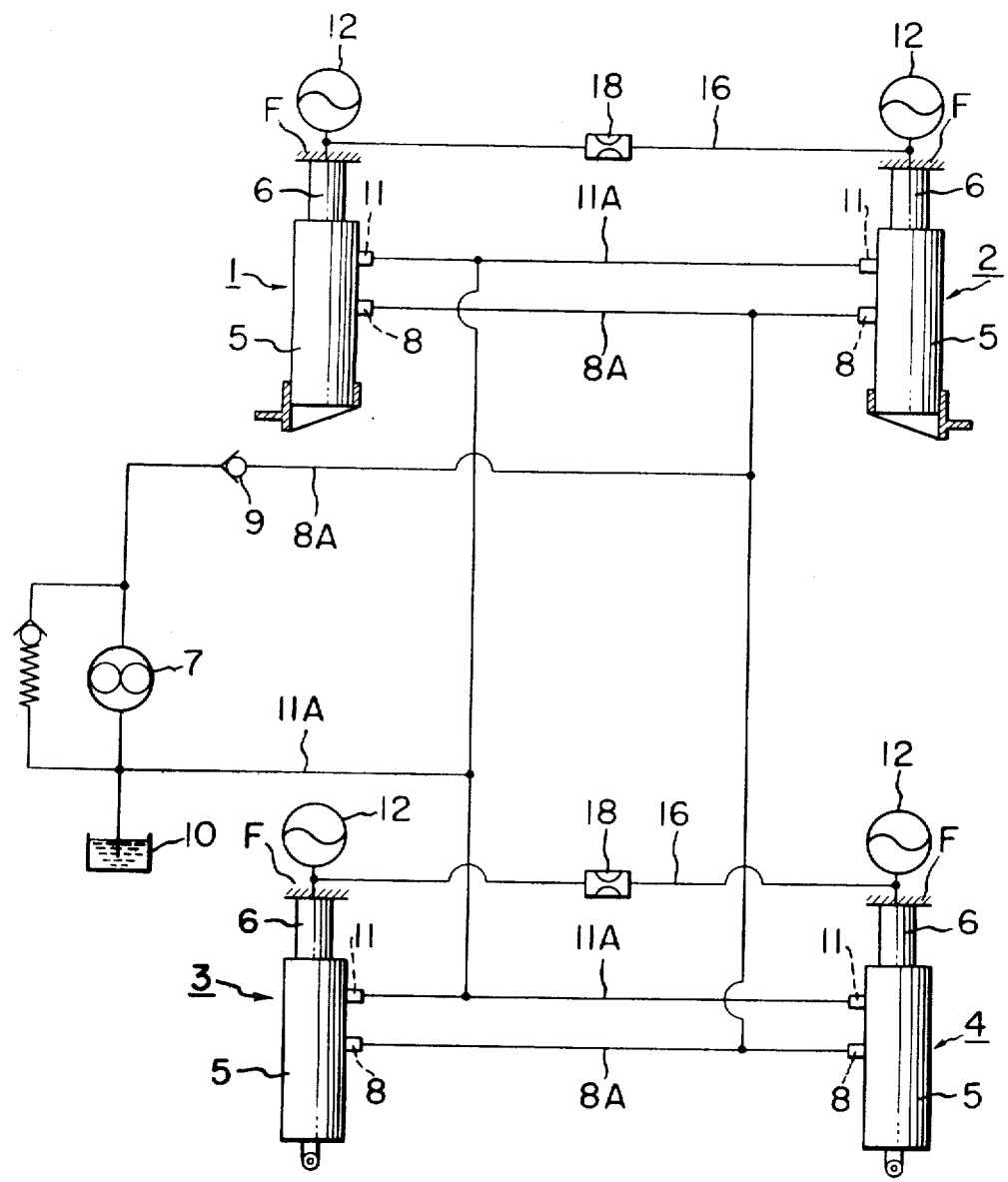
FIG. 1 represents an oil-hydraulic circuit diagram of the device embodying the present invention.

In FIG. 1, there is diagrammatically illustrated a height control device for automobile use embodying the present invention and including a set of four shock absorbers 1, 2, 3 and 4 arranged between the body frame F of an automobile and the two parts of front and rear wheels, not shown. The shock absorbers are each telescopically constructed with an outer tubular member or cylinder 5 connected at the bottom with the associated wheel and an inner tubular member or cylinder 6 slidably fitted in the outer cylinder 5 and connected at the top with the body frame F. The outer cylinder 5 is formed in the side wall thereof with a pressure oil inlet port 8 and an oil outlet port 11, which is located above the inlet port 8. The inlet ports 8 of the outer cylinders 5 of the respective shock abcorbers are connected with a common pressure oil passage line 8A, which is led from the delivery port of an oil pressure pump 7 and includes a pressure retainer valve 9. Meanwhile, the outlet ports 11 of the respective outer cylinders 5 are connected with a common exhaust oil passage line 11A, which opens to an oil reservoir tank 10. A pressure accumulator 12, having a pressure gas chamber, is arranged above each of the inner cylinders 6 in communication with the interior space thereof. Further, each pair of the inner cylinders 6 fixed to the body frame F on the right and left sides thereof are connected with each other for fluid communication by means of a fluid passage line 16 including an orifice 18.

Description will next be made of the construction of the telescopic shock absorbers, which are all of the same construction, with reference to FIG. 2, which illustrates in section one of such shock absorbers, 3 associated with the rear left wheel.

As shown in FIG. 2, the inner cylinder 6 is supported for vertical sliding movement relative to the outer cylinder 5 by a tubular bearing member or sleeve 20 firmly fixed in the open top portion of the outer cylinder 5 with a slide piston 21 fixed to the bottom end of the inner cylinder 6 and slidably fitted in the outer cylinder 5 to divide the interior space thereof into an upper and a lower oil chamber $a$ and $b$. The slide piston 21 is provided with an ordinary buffer valve 22 which serves to control fluid communication between the upper and lower oil chambers $a$ and $b$. Further, the upper oil chamber $a$ in the outer cylinder 5 is held in fluid communication with another oil chamber $c$ defined in the inner cylinder 6 through apertures 23 formed in the wall thereof.

The slide bearing or sleeve 20 has a pair of upper and lower annular grooves 24 and 25 formed in the inner peripheral surface thereof and normally held in communication with the oil outlet port 11 and the oil inlet port 8, respectively, of the outer cylinder 5. Seal members 29, 30 and 31 are fitted, as shown, in the respective land portions 26, 27 and 28 of the inner peripheral surface of bearing sleeve 20. The central land portion 27, having a predetermined axial width, forms an oil control valve, V, in co-operation with an aperture 32 extending through the adjacent side wall of the inner cylinder 6. It is to be understood that the aperture 32 is so sized as to provide a resistance to oil flow therethrough larger than that of the buffer valve 22.

Again referring to FIG. 2, reference numeral 33 designates a swing axle provided to support a rear wheel and pivoted at its base end to the body frame F, as indicated at 34. The swing axle 33 is also pivoted intermediate its ends to the bottom of the outer cylinder 5 of the associated shock absorber 3, as indicated at 35, and supports a rear wheel, not shown, at the free end.

Operation of the height control device described above will next be described. In the normal state it assumes when the vehicle is keeping its normal height, the aperture 32 in the inner cylinder 6 is covered by the slide bearing 20, lying within the axial range of the central land portion 27 thereof, as shown in FIG. 2, so that the upper and lower annular grooves 24 and 25 in the slide bearing 20 are out of fluid communication with each other and with the oil chamber $c$. It is to be noted in this connection that the lower annular groove 25 is held at all times under oil pressure, communicating with the pressure oil passage line 8A, and the pressure oil held in the groove 25 tends to leak to the low pressure side and more particularly to the top end of slide bearing 20. However, on account of the upper annular groove 24, lying between the lower annular groove 25 and the top end of slide bearing 20 and at all times held in communication with the exhaust oil passage line 11A, the pressure oil in the lower annular groove 25 can only flow out into the exhaust oil passage line 11A, but can never leak exteriorly through the top end of slide bearing 20, even if allowed to leak upwardly from the lower groove 25.

Now, it is assumed that the height of the vehicle is reduced below the normal level under the vertically downward force acting upon the body frame F and increasing with the passenger and/or luggage load. Under the condition, the inner cylinder 6 of each of the shock absorbers 1 to 4 is moved downward relative to the outer cylinder 5 and the oil aperture 32 is moved finally apart from the lower edge of the central land portion 27 of slide bearing 20 to open into the lower annular groove 25 therein. As the result, the oil chamber $c$ in the inner cylinder 6 is placed in fluid communication with the pressure oil passage line 8A through the oil aperture 32 and lower annular groove 25, which is at all times in communication with the pressure oil inlet line 8A, so that pressure oil from the oil pressure pump 7 is fed to the oil chamber $c$ and hence to the upper and lower oil chambers $a$ and $b$ in the outer cylinder 5 through the apertures 23 and buffer valve 22, respectively, to exert the oil pressure upon both the upper and lower end surfaces of the slide piston 21. Accordingly, the slide piston 21 with its top exposed area smaller than its bottom exposed area is driven upwardly until the oil aperture 32 is restored to its normal position and closed again by the central land portion 27 of the slide bearing 20 to de-energize the oil chamber $c$ in the inner cylinder 6. Simultaneously with this, the vehicle height is obviously restored to its normal level and the slide piston 21 comes to stop to maintain the normal height of the vehicle.

Contrariwise, if the downward load upon the body frame F is reduced to increase the vehicle height above the normal level, the oil aperture 32 in the inner cylinder 6 comes this time to open to the upper annular groove 24 in the slide bearing 20 to place the oil chamber $c$ in communication with the exhaust oil passage line 11A and in this manner the slide piston 21 is allowed to descend until the normal vehicle height is restored. It will be understood that such function of compensating the vehicle height is effected by each of the shock absorbers 1, 2, 3 and 4 independently from each other so that lateral inclination of the body frame F as resulting from one-sided load or sudden brake engagement can also be effectively corrected by the height control device in an automatic fashion.

If the wheels of the vehicle are caused to oscillate up and down as when the vehicle travels over an irregular road surface, the shock absorbers 1, 2, 3 and 4 associated with the respective wheels are caused to extend and contract independently from each other and, in each of the shock absorbers, the buffer valve 22 gives an appropriate flow resistance to the oil flowing back and forth between the upper and lower oil chambers $a$ and $b$ connected with each other through the oil chamber $c$, so that vibrations and/or shocks given to the body frame F are effectively alleviated as with the case of conventional shock absorbers. During such telescopic operation of the shock absorbers 1, 2, 3 and 4, the oil aperture 32 formed in the side wall of the inner cylinder 6 may sometimes open to the upper and lower annular grooves 24 and 25. In such cases, however, the amount of oil flow through the aperture 32 is very limited on account of the relatively high frequency of the telescopic action of the shock absorber and the substantial resistance of the aperture 32 to the oil flow therethrough and the vehicle height remains substantially unchanged.

During turning movement of the vehicle, the body frame F is more or less inclined sidewise in a continuous manner under the centrifugal effect to sink on the radially inner side while floating on the radially outer side. If, in such situation, the vehicle-height compensating function of the telescopic shock absorbers 1 to 4 be performed slowly, the re-compensating operation of the shock absorbers when subsequently the turning direction of the vehicle is reversed must be delayed to a substantial extent. This delay in operation, in combination with the tendency of the vehicle to tilt in the opposite direction under the centrifugal force now changed in direction, might cause unusual sidewise inclination of the vehicle, endangering its travel.

In order to avoid such danger, each pair of right and left shock absorbers 2 and 1 or 4 and 3 in the embodiment illustrated are held in fluid communication with each other by way of the oil passage line 16 with orifice means 18 inserted therein, as described hereinbefore. With this arrangement, when the vehicle is turned during travel and the opposite sides of the body frame F are raised and lowered, respectively, oil may be fed through the pressure oil passage line 8A into the shock absorbers arranged on one or the other side of the vehicle, e.g., shock absorbers 1 and 3 and tend to flow through the respective oil passage lines 16 to the shock absorbers 2 and 4 arranged on the opposite side of the vehicle. On the other hand, the shock absorbers 2 and 4 are reduced in pressure as it is exhausted through the oil passage line 11A, thus allowing the pressure oil flowing out of the shock absorbers 1 and 3 to flow through the orifices 18 into the respective shock absorbers 2 and 4 to immediately establish a state of hydraulic equilibrium between the shock absorbers 1 and 3, on the one hand, and the shock absorbers 2 and 4, on the other hand. In this manner, the shock absorbers 1 to 4 are disabled or get rid of any vehicle-height compensating function, enabling the vehicle to run the curved course posturing in the same way as with the case of an oridinary vehicle not equipped with any height control device.

Incidentally, in the event that the two shock absorbers on either side of the vehicle are contracted on account of a one-sided load, they can function in a usual manner to compensate the change in height of the vehicle on that side owing to the fact that the two shock absorbers on the other side remain this time unextended unlike those on the radially inner side when the vehicle is turned and that the tendency of the pressure oil fed to the contracted shock absorbers to flow out through the oil passage lines 16 to the shock absorbers on the opposite side is effectively resisted by the orifice means 18 provided in the oil passage lines 16.

As apparent from the foregoing description, in the height control device of the present invention, the telescopic shock absorbers 1 to 4 not only serve the function of alleviating shocks and vibrations of the vehicle body as caused by an irregular road surface but effectively serve the purpose of compensating change in height of the vehicle in an automatic fashion. Use of such dual-purpose shock absorbers affords distinct advantages that the number of components of the device as a whole is accordingly reduced, enabling production of such device at minimized cost; and that, unlike any conventional height control device, the device of the present invention requires no extra space under the vehicle body for installation, making it possible to arrange the wheel suspension means freely under the body frame F in positions normally desired with ordinary vehicles. In addition, in the device of the present invention, the oil control valve, V, formed in each of the shock absorbers 1 to 4 includes upper and lower annular grooves 24 and 25 held at all times in communication with the oil outlet and inlet posts 11 and 8, respectively, as described. This arrangement is advantageous in that it does not necessitate use of any costly high-pressure sealing elements as any pressure oil possibly leaking out of the lower annular groove 25 can never leak exteriorly of the shock absorber unit even if it leaks to the oil outlet 11 or further to another shock absorber unit.

While one preferred embodiment of the present invention has been shown and described, it will be apparent to those skilled in the art that many changes and modifications may be made therein without departing from the spirit of the invention or the scope of the appended claims.

We claim:

1. A vehicle-height control device for use on a vehicle between the body and the wheels thereof, said device comprising telescopic hydraulic shock absorbers arranged between the body and respective wheels of the vehicle, each including a hollow inner cylinder, an outer cylinder slidably fitted over said inner cylinder and in fluid communication therewith, a buffer valve between said cylinders to provide a resistance to flow of fluid in the shock absorber between said inner and outer cylinders upon relative sliding movement thereof, during extension and contraction of the shock absorber, said outer cylinder having a fluid inlet port in communication with a source of fluid under pressure, said outer cylinder also having a fluid outlet port in communication with ambient atmosphere, and control valve means between said inner and outer cylinders for placing said fluid inlet port in communication with the interior of the shock absorber upon contraction thereof below a predetermined axial length and for placing said fluid outlet port in communication with the interior of the shock absorber upon extension thereof above said predetermined axial length, said control valve means providing a resistance to fluid flow larger than that of said buffer valve, said control valve means comprising a body mounted between said cylinders and having a pair of upper and lower annular grooves facing said inner cylinder, said upper and lower grooves having a predetermined vertical spacing with a land portion formed therebetween, said inner cylinder having a through aperture disposed in a position to be closed by the land portion between said upper and lower annular grooves with the shock absorber in a normal length configuration, said upper and lower annular grooves being in communication with said outlet and inlet ports, respectively.

2. A vehicle-height control device as claimed in claim 1 wherein the source of pressure fluid is connected to the inlet ports of all of the shock absorbers in common.

3. A vehicle-height control device as claimed in claim 1 comprising a pressure accumulator connected to each respective inner cylinder.

4. A vehicle-height control device as claimed in claim 1 wherein said body of the control valve means is secured to the outer cylinder and is slidable on the inner cylinder.

5. A vehicle-height control device as claimed in claim 1 comprising a slide piston secured to said cylinder and slidable in the outer cylinder to separate the interior of the inner cylinder from the interior of the outer cylinder, said buffer valve being in said slide piston.

6. A vehicle-height control device as claimed in claim 5 wherein a chamber is formed between the inner and outer cylinders and between said body and said piston.

7. A vehicle-height control device as claimed in claim 6 wherein said inner cylinder has an aperture providing communication between said chamber and the interior of the inner cylinder.

8. A vehicle-height control device as claimed in claim 4 wherein said body of the control valve means has opposite ends with lands which ride on the inner cylinder, and comprising seals between said lands of the body of the control valve and said inner cylinder.

9. A vehicle-height device as claimed in claim 8 wherein said upper and lower annular grooves are disposed between respective adjacent lands of said body of the control valve.

* * * * *